Patented Apr. 9, 1929.

1,708,001

UNITED STATES PATENT OFFICE.

ANDRÉ WAHL, OF ENGHIEN, AND ROBERT LANTZ, OF PARIS, FRANCE, ASSIGNORS OF ONE-HALF TO SOCIETE ANONYME DES MATIERES COLORANTES ET PRODUITS CHIMIQUES DE SAINT-DENIS, OF PARIS, FRANCE.

MANUFACTURE OF NAPHTHOQUINONE DERIVATIVES.

No Drawing. Application filed October 22, 1923, Serial No. 670,099, and in France October 30, 1922.

Among the diarylamino derivatives of naphthoquinones there have been known hitherto only the 4-arylimino-2-arylamino-α-naphthoquinones, corresponding with the general formula:

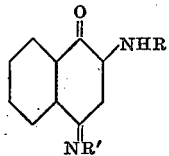

and obtainable by numerous reactions.

According to the present invention there is made a new class of diaryl derivatives of naphthoquinones, isomeric with those mentioned above, by starting from the arylimino-β-naphthoquinones which have been described in Patent No. 1,599,444, dated September 14, 1926, relating to the manufacture of new derivatives of naphthoquinone.

The 1-arylimino-β-naphthoquinones react easily with primary amines even in the cold and in absence or presence of a solvent. Thus, if aniline is caused to act on 1-phenylimino-β-naphthoquinone there is obtained one molecule of 1-phenylamino-2-hydroxynaphthalene and a new condensation product the analysis of which corresponds with the formula $C_{22}H_{16}N_2O$ and the constitution of which may be expressed by one of the two formulæ herein marked A and B, which are here used indifferently

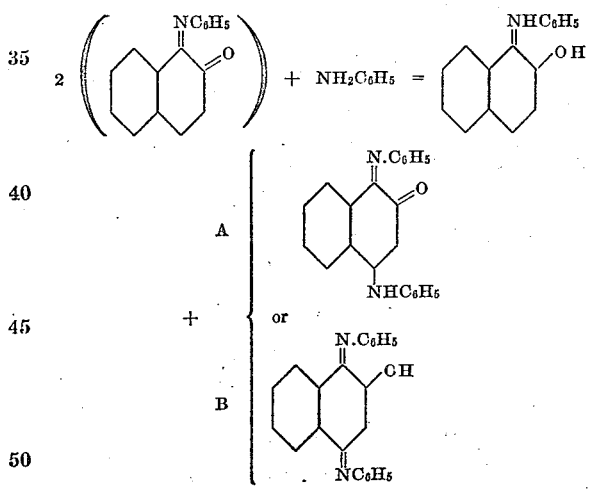

There is here concerned a general reaction, that is to say by causing arylamines of very varied kinds to react with 1-arylamino-β-naphthoquinones, there is obtained a series of new compounds which constitute the higher homologues or the immediate derivatives of the compound $C_{22}H_{16}N_2O$.

These new derivatives constitute isomerides of the 4-arylimino-2-arylamino-α-naphthoquinones (II) which are already known as indicated by the following formulæ

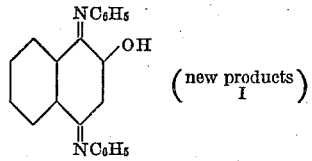

(new products I)

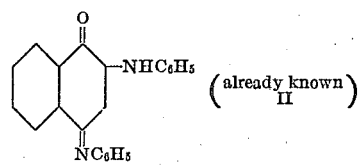

(already known II)

The unexpected observation has been made, however, that by causing a primary arylamine to act on a 1-arylimino-β-naphthoquinone, in which the arylated radicle is different, there may be, according to the conditions, at the same time a fixing of the arylamine residue and a substitution of the latter for the arylamino residue which already existed in the 1-arylimino-β-naphthoquinone. For example, by causing paratoluidine in excess to act on 1-phenylimino-β-naphthoquinone the residue of the para-toluidine takes the place of that of aniline at the same time that it becomes fixed in the molecule

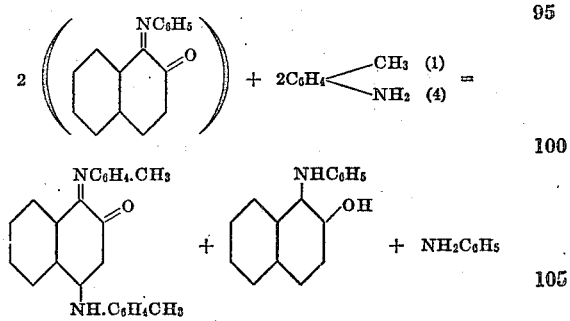

The mechanism of this reaction appears to be as follows:—The para-toluidine is first added normally according to the equation

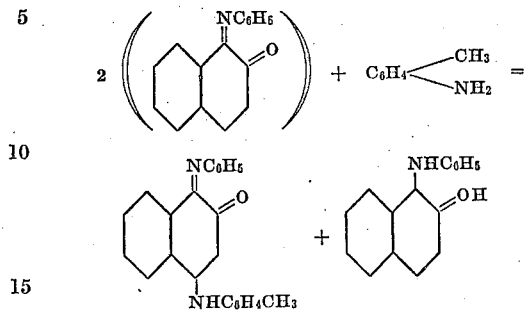

Then the 4-tolylamino-1-phenylimino-β-naphthoquinone thus formed reacts with para-toluidine present in excess in accordance with the equation:

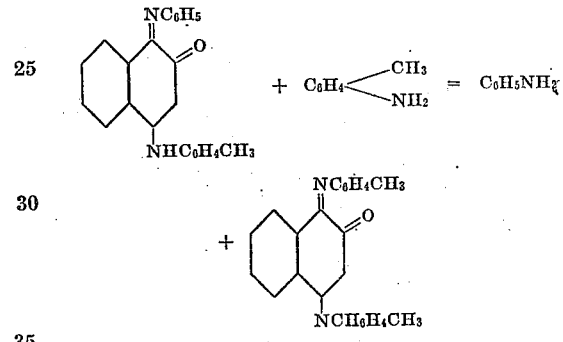

This interpretation is moreover confirmed by the fact that if an excess of a primary arylamine $R.NH_2$ is caused to act on a 4-arylamine-1-arylimino-β-naphthoquinone there is an effective substitution of the aryl residue in the arylimino group by the aryl residue of the amine according to the equation

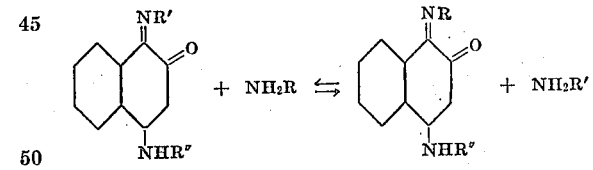

It follows that this transformation is reversible and that it will be the more complete the greater the proportion of the amine used as a reagent.

Under these conditions the group in the 4-position remains unaltered. Thus the observation in question permits of the preparation of 4-aryl-amino-1-arylimino-β-naphthoquinones in which the groups in positions 1 and 4 may be identical or different. In fact to obtain compounds which for greater simplicity we will call symmetrical, an excess of an arylamine is caused to act on a 1-arylimino-β-naphthoquinone, the arylated groups being identical or different:

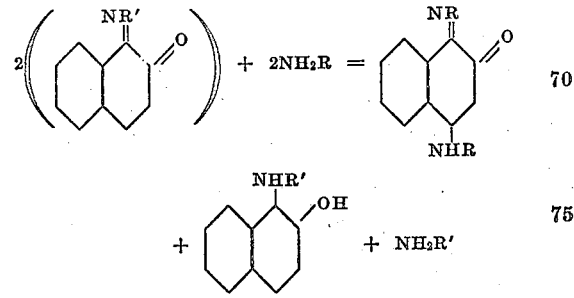

(R and R' indicating two arylated residues which may also be identical).

If the proportion of amine taking part in the reaction is insufficient, or if the conditions of temperature, dilution or the like are suitably chosen, the substitution in position 1 may be only partial.

The compounds herein called unsymmetrical may be obtained by causing an excess of a different amine to act on the aforesaid symmetrical compounds.

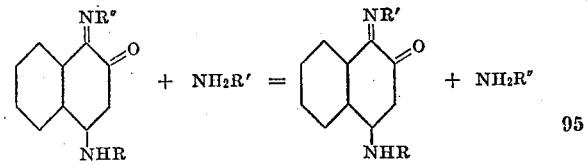

or, again, by the action of an amine on an unsymmetrical compound having in position 4 an arylamino residue different from that of the amine taking part in the reaction.

Furthermore it has been found that by causing amines to react with arylimino-β-naphthoquinones in presence of an oxidizing agent or even merely in contact with excess of air and with a suitable catalytic agent, the molecule of oxyaryl-naphthylamine which is formed in the reaction and constitutes a troublesome secondary product, regenerates by oxidation the aryliminonaphthoquinone which thus is finally wholly brought into the reaction which may be expressed as follows:—

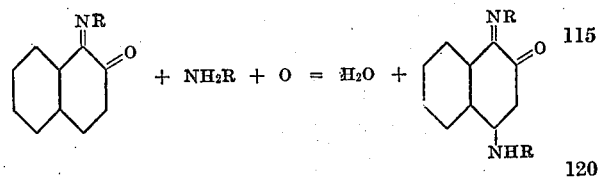

Under these conditions it is not even necessary first to subject the oxyarylnaphthylamines to an oxidation for the purpose of transforming them into aryliminonaphthoquinones. It is sufficient to dissolve the oxyarylnaphthylamine in an excess of the amine, to pass a current of air in presence or absence of a solvent, and in presence of a cata-

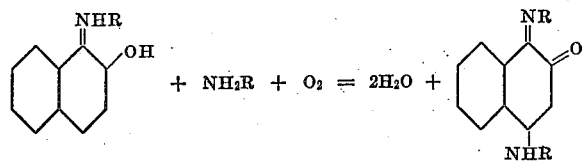

lyst consisting of a metal oxide, such as lime, baryta, copper oxide, at a suitable temperature, in order to obtain directly the desired compounds.

The product forms generally under these conditions a compound with the metallic oxide present and this compound for the most part separates in the form of crystals of great purity, particularly if the catalyst is copper oxide.

It will be seen from the foregoing that the compounds obtained in the reaction in question may be symmetrical or unsymmetrical correspondingly with the relative proportions of the reagents or the experimental conditions.

The new compounds have the form of brown red crystals insoluble in water, soluble in organic solvents, such as chloroform or boiling toluene, little soluble in ether, soluble in concentrated sulphuric acid to a solution the colour of which varies according to the arylamine residue and liable to become brown red to black violet.

This invention relates to the manufacture of new derivatives of naphthoquinones by the reactions and changes hereinbefore described. It is illustrated by the following examples, the conditions named in which, however, may be considerably modified.

*Example 1.*—Manufacture of symmetrical-4-arylamino-1-arylimino-β-naphthoquinone.

Into an apparatus having a stirrer there is poured a mixture of 53 grams of aniline diluted with its own weight of acetone and into this is introduced in small doses in the course of about three hours 90 grams of 1-phenylimino-β-naphthoquinone freshly pressed and crushed. When the introduction is finished the mixture is left to itself for one hour and the brown crystals which have formed, are drained, washed with ether and dried. They may be purified by recrystallization from a mixture of chloroform and light petroleum. In the mother liquor from the crude product there exists the 1-phenylamino-2-hydroxy-naphthalene formed as a secondary product. The aniline may be removed by a current of steam and the residue extracted with caustic soda solution. On acidifying the solution thus obtained the 1-phenylamino-2-hydroxy-naphthalene is precipitated. The reaction may be represented by the following equation

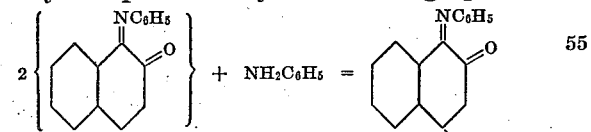

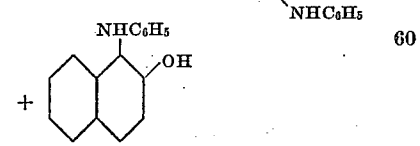

The analysis gave the following numbers:

|   | Found | Calculated for $C_{22}H_{16}ON_2$ |
|---|---|---|
| C. | 81.2 | 81.5 |
| H. | 5.5 | 4.9 |
| N. | 8.65 | 8.64 |

The 4-phenylamino-1-phenylimino-β-naphthoquinone forms brown red crystals insoluble in water, little soluble in ether or methyl alcohol and very soluble in chloroform. The sulphuric acid solution is brown red.

If, in this example there is substituted for aniline a large excess of para-toluidine there is obtained 4-para-tolylamino-1-paratolyl-imino-β-naphthoquinone.

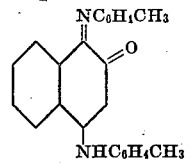

It crystallizes in brown prisms, the solubility of which is analogous to the preceding compound; the solution in sulphuric acid is violet.

|   | Found | Calculated for $C_{24}H_{20}ON_2$ |
|---|---|---|
| C. | 81.96 | 81.82 |
| H. | 5.48 | 5.67 |
| N. | 7.95 | 7.95 |

*Example 2.*—4-arylamino-1-arylimino-β-naphthoquinones which are unsymmetrical may be obtained for instance in the following manner:—

5 parts of 4-phenylamino-1-phenylimino-β-naphthoquinone are dissolved in 60 parts of chloroform and to the solution is added one of 15 parts of paratoluidine in 50 parts of chloroform and the whole is agitated for half an hour to one hour at the ordinary temperature. The progress of the reaction may be followed by examining the colour of a test spot with sulphuric acid. This colour should pass from a red brown to a violet red. The chloroform is evaporated on the water bath and the crystallized residue is purified by crystallization first from petroleum and then from acetone.

The properties of the compound indicate that it has the unsymmetrical formula and that it arises by substitution of the para-toluidine residue in position 1.

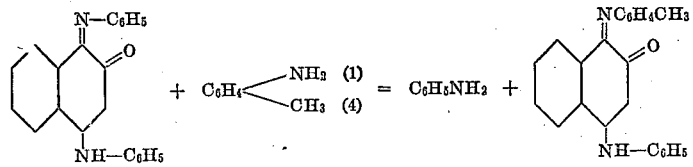

*Example 3. Oxidation by air in presence of an amine.*—A mixture of 20 grams of 1-phenylamino-2-hydroxynaphthalene and 300 grams of aniline are stirred for 10 hours in an open vessel while air is caused to bubble through the mixture, 5–10 grams of hydrated cupric oxide being present. The liquid becomes dark brown and there is precipitated a well crystallized compound which constitutes the cupric compound of 4-phenylamino-1-phenylimino-β-naphthoquinone. The content of copper is 8.3 to 8.6 per cent.

*Example 4.*—If in the previous example some other amine is substituted for aniline the reaction is analogous. Thus by agitating violently for 7–8 hours in presence of air 10 grams of 1-phenylamino-2-hydroxynaphthalene dissolved in 100 grams of ortho-anisidine to which 3 grams of hydrated cupric oxide (dried in the air at ordinary temperature) have been added, there is obtained, when the reaction is finished, a crystalline powder which is drained and washed with ether, and may be recrystallized from a mixture of ether and chloroform. Analysis of this product and its properties show that the reaction is as follows:

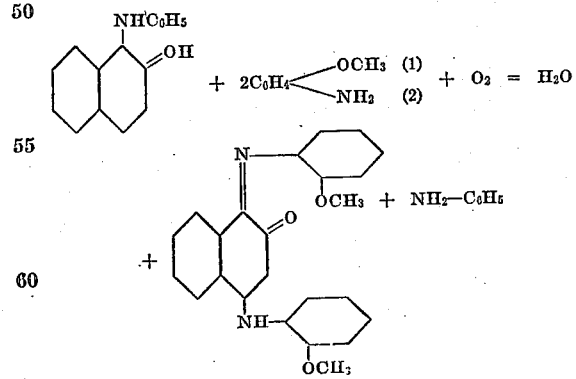

The cupric compound corresponds with the formula:

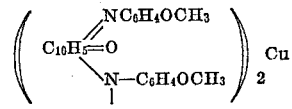

or to the tautomeric formula:

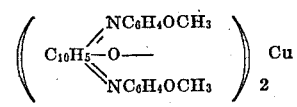

|  | Found | Calculated |
|---|---|---|
| C. | 69.78 | 69.4 |
| H. | 4.95 | 4.58 |
| N. | 6.98 | 6.75 |
| Cu. | 7.74 | 7.66 |

Instead of the oxide of copper another base, such as lime or baryta may be used in this example.

What we claim is:—

1. The herein described manufacture of 4-arylamino-1-arylimino-β-naphthoquinones by the action of a primary aromatic amine on a 1-arylimino-β-naphthoquinone.

2. 4-arylamino-1-arylimino-β-naphthoquinones which can be made by the manufacture referred to in the preceding claim.

In testimony whereof we have signed this specification.

ANDRÉ WAHL.
ROBERT LANTZ.